United States Patent [19]
Hughes

[11] 3,742,972
[45] July 3, 1973

[54] TWIN REGULATOR ARRANGEMENT
[75] Inventor: George C. Hughes, Anderson, Ind.
[73] Assignee: Textron Inc., Providence, R.I.
[22] Filed: Jan. 3, 1972
[21] Appl. No.: 214,930

[52] U.S. Cl............. 137/110, 137/505.47, 137/599
[51] Int. Cl............................................ F16k 31/12
[58] Field of Search................ 137/109, 110, 116.3,
137/116.5, 505.12, 505.46, 505.47, 599;
251/DIG. 3

[56] References Cited
UNITED STATES PATENTS

| 3,260,278 | 7/1966 | Lund et al. | 137/505.12 X |
| 2,898,909 | 8/1959 | Jayet | 137/110 |
| 337,431 | 3/1886 | Pintsch | 251/DIG. 3 |
| 3,151,628 | 10/1964 | Heckert | 251/DIG. 3 |
| 3,488,685 | 1/1970 | Hughes | 137/116.5 |
| 3,525,356 | 8/1970 | Johnson et al. | 137/505.46 X |
| 3,599,658 | 8/1971 | Kruzan et al. | 137/116.5 |

Primary Examiner—Alan Cohan
Attorney—Arthur A. Johnson et al.

[57] ABSTRACT

Two gas service regulators each having substantially the same size orifices, which orifices together meet the maximum volume required at the lowest inlet pressure, are connected together by a unitary valve body having outlet and inlet chambers each common to both regulators, each regulator having pressure-responsive means and a valve seat operated thereby, and said valve body having orifice tubes, one for each valve seat, to normally control the flow of gas from said inlet chamber to said outlet chamber, there being in said inlet chamber auxiliary valve means adapted to control the flow of gas from said inlet chamber to said orifice tubes in the event of malfunctioning of either regulator or of foreign matter being lodged between the valve seat and its orifice tube, said orifice tubes being axially slidable and axially aligned, said auxiliary valve means comprising said orifice tubes, and a coil spring interposed between said inlet chamber and said orifice tubes and being compressible to control the flow of gas through its coils to the extent of essentially stopping the flow of gas from said inlet chamber to said orifice tubes in the event of malfunctioning of the regulator or regulators.

4 Claims, 5 Drawing Figures

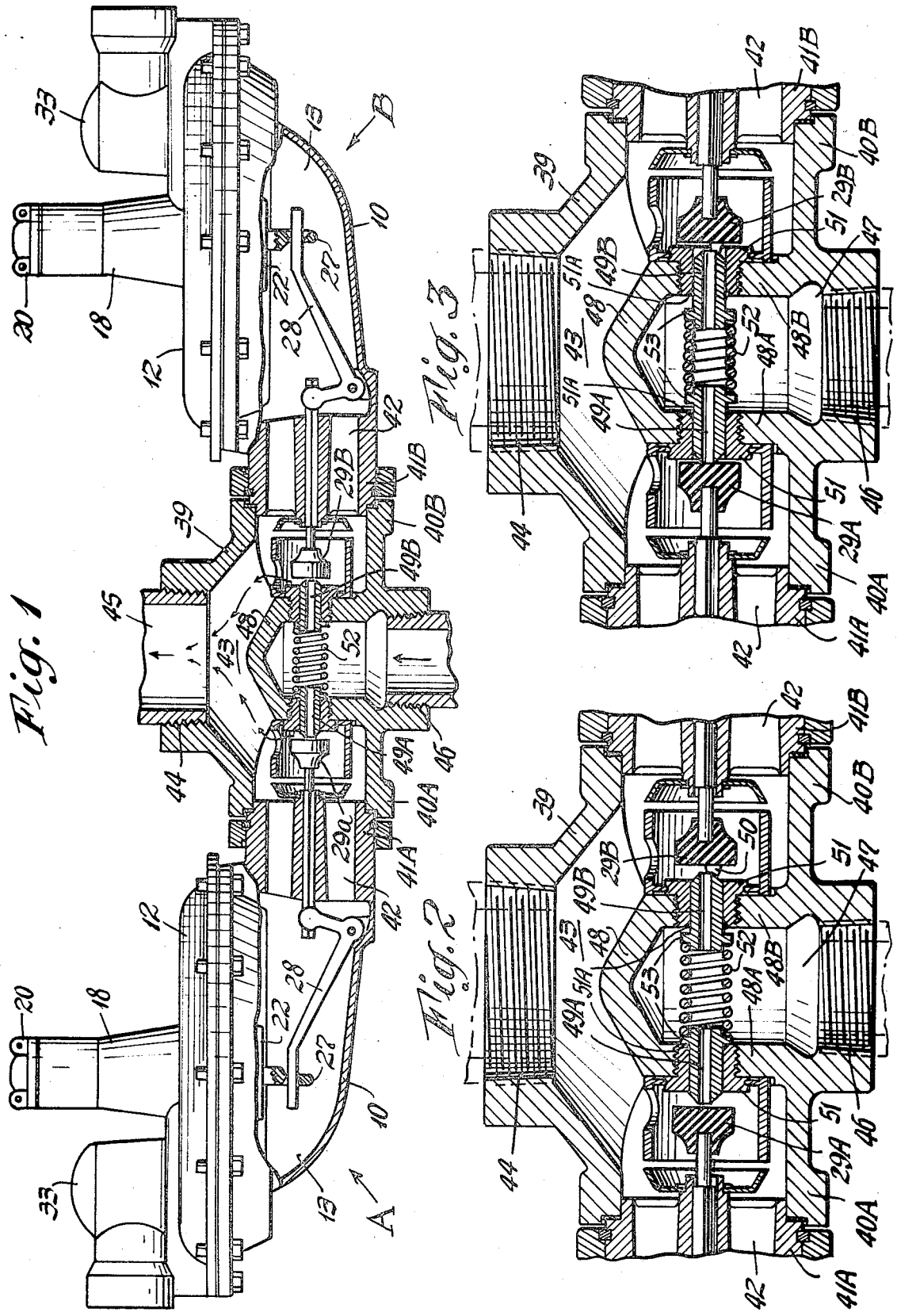

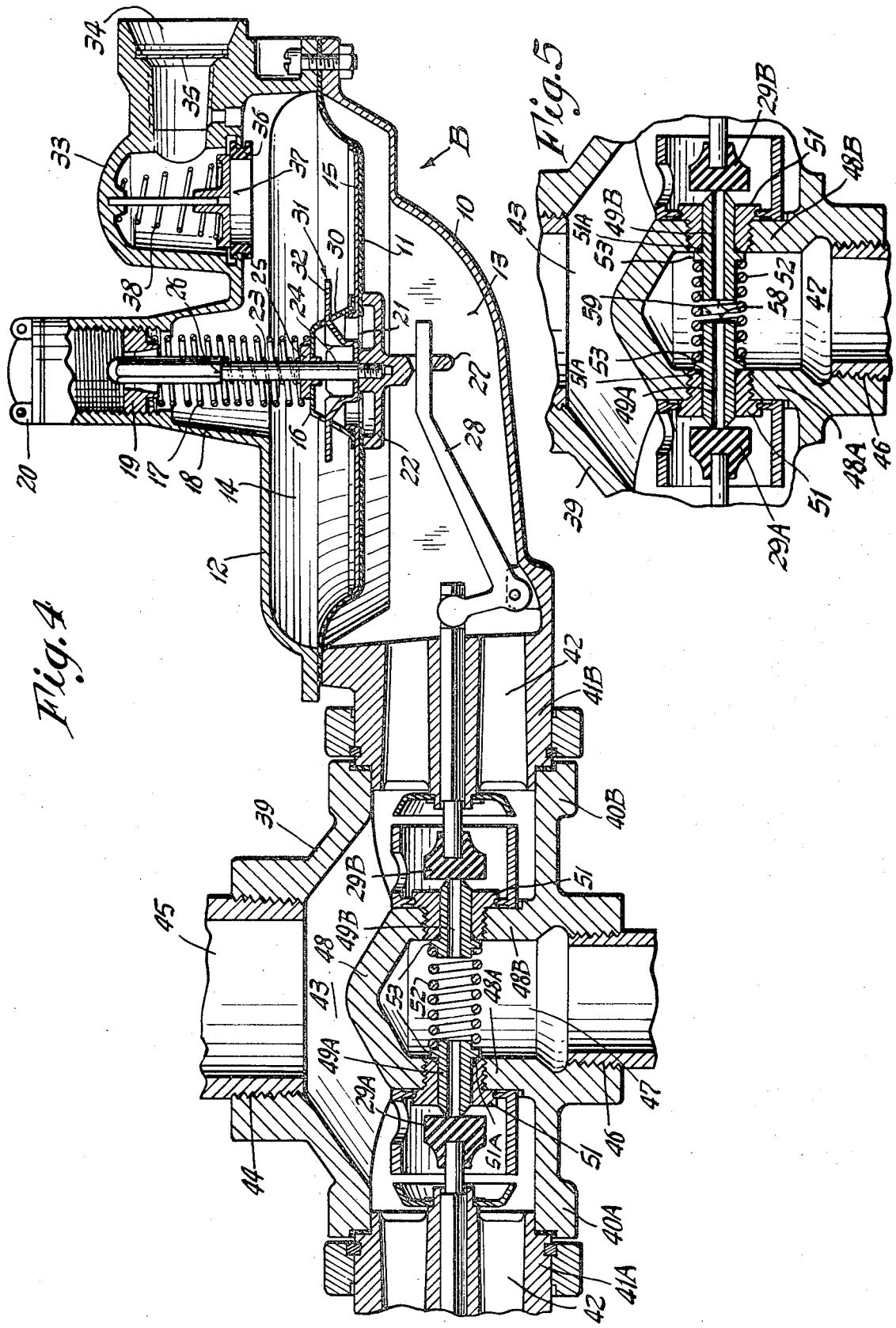

TWIN REGULATOR ARRANGEMENT

This invention relates to gas pressure regulating, and more particularly to improvements in gas regulators.

Heretofore it was quite the common practice for two service regulators to be installed in parallel piping with a common inlet and outlet arrangement, so that smaller and less costly regulators could be used. In such arrangements, two smaller orifices may be used to meet the maximum volume required at the lowest inlet pressure rather than one large orifice which would otherwise be needed.

According to the present invention, two such service regulators are incorporated with a single valve body which eliminates the need for parallel piping, thus reducing the number of gastight connections which otherwise would be required and saving in the cost of piping and installation.

Heretofore it was customary in many installations for safety sake to provide a service regulator connected to an upstream monitor regulator with a downstream control line to control the flow of gas to the service connections in the event that the service regulator malfunctions.

To protect downstream equipment and to avoid the excessive or dangerous escape of gas to the atmosphere through the safety vent means of the regulators, in the event of either or both of the regulators malfunctioning, for instance by foreign matter becoming lodged between an orifice tube and a valve seat, the present invention provides in said valve body an auxiliary monitoring valve means for controlling the flow of gas from an inlet chamber in said valve body to the orifice means leading to the service regulators.

Preferably the auxiliary valve is in the form of an expanded coil spring, such as disclosed in U.S. Pat. No. 337,431, through the coils of which the gas flows to the orifice tubes so that when the spring is compressed the space between the coils is reduced to restrict the flow of gas to the orifice tubes, even to the degree of the space between the coils being essentially closed to substantially cutoff the flow of gas depending on the cause or degree of malfunctioning. The auxliary valve obviates the need for a monitor regulator, and being simple and inexpensive it substantially reduces the cost of gas service installations.

According to the present invention in its preferred form herein illustrated and described, the orifice tube means are coaxial and axially slidably mounted in and extend through a dividing wall in the valve body from the inlet chamber to the outlet chamber, their outward movement being limited by stop means on the orifice tube means engaging the dividing wall. The coil spring is coaxial with the orifice tube means and engages the inner end of the orifice tubes.

In operation, the diaphragm control valve seat means for the two regulators of the present invention normally operate simultaneously in regulating the downstream gas pressure in the service line by moving closer to or away from engagement with the end of the orifice tubes as the gas pressure in the line fluctuates. However, should a malfunction of one or both of the regulators prevent either valve seat means from stopping the flow of gas through either orifice means, the downstream pressure would become so high that the gas would escape through the safety valve in the diaphragm to the atmosphere chamber and from the latter through the safety vent valve to the atmosphere. This could cause a dangerous condition to exist.

With the use of the present invention, however, when force is applied to the outer end of the orifice tube by foreign matter preventing the valve seat from engaging the end of the orifice tube, the latter will be forced inwardly against the force of the coil spring and thus cause the coils of the spring to close more or less as the pressure in the regulators varies. If the foreign matter is sufficiently large or the regulator malfunctions so that there is not substantial space between the coils, the flow of gas will be virtually stopped.

When the pressure in the outlet chamber exceeds somewhat a normal overpressure, in the above situation the operative regulator which is still operative would respond and cause its valve seat means to more or less close on its orifice tube and would merely control the flow of gas to the outlet chamber jointly with the coil spring until the pressure reaches a value at which its valve seat closes on its orifice tube in which event the spring valve solely controls the flow of gas.

Other features and advantages will hereinafter appear.

In the accompanying drawings:

FIG. 1 is a side view of the twin regulators of the present invention showing parts of the regulators and coupling valve body in section.

FIG. 2 is a vertical section of the valve body showing a piece of foreign matter lodged between an inlet orifice and the adjacent valve seat.

FIG. 3 is a view like FIG. 2 but showing the relative positions of the parts when the monitor valve stops the flow of gas from the inlet chamber to the outlet chamber of the valve body.

FIG. 4 is a sectional view of one of the two identical regulators and the valve body showing the position of the parts when maximum allowable operating pressure is present in the regulators.

FIG. 5 is a sectional view of a modification of the present invention wherein the flow of gas to the orifice tubes is controlled by a monitoring valve in which the inner ends of the orifice tubes control the flow of gas to the orifice tubes.

As shown in the accompanying drawings, the gas regulator means of the present invention comprises two service regulators A and B which may be identical in construction and also in operation under normal operating conditions. They may be constructed, for instance, according to U.S. Pat. No. 3,488,685. Each regulator, as illustrated and described herein, comprises a housing 10 having a diaphragm 11, preferably of synthetic material, extending across its upper end. The diaphragm 11 is securely clamped in place by a cover 12 and forms a pressure chamber 13 and an atmospheric pressure chamber 14.

Each diaphragm 11 is backed up by a metal plate 15 which carries a spring perch 16 which supports one end of a main regulator spring 17 extending upwardly into the regulator spring housing 18 carried by the cover 12. The upper end of the spring 17 engages an abutment 19 threaded into the housing 18 and adjustable, after the removal of a cap 20 for the housing 18, to provide the required counter pressure on the diaphragms 11.

Each diaphragm 11 has a central opening 21 which is normally closed by a safety valve head 22 which is urged to closed position by a spring 23 disposed around the valve stem 24. The spring 23 has one end engaging a valve stem bearing 25 carried by the perch 16 and the other end engaging an abutment 26 on the valve stem 24. Normally, the safety valve head 22 moves with the diaphragm.

Each safety valve head 22 has an apertured extension 27 which receives one end of a pivoted lever 28. One of said levers is connected to an inlet valve seat 29A in the regulator A and the other is connected to an inlet valve seat 29B in the regulator B. The valve seats 29A and 29B control the flow of gas to the chambers 13 in response to movement of the diaphragms 11 under pressure in the pressure chambers.

As shown in FIG. 4, the spring perch 16 of each regulator, as shown in Applicant's U.S. Pat. No. 3,488,685, has a plurality of apertures 30 and the valve stem 24 loosely carries a yoke 31 which is supported on the valve head 22, the yoke 31 having wings 32 extending through the apertures 30 and laterally to a position to engage the undersurface of the cover 12 to stop movement of the safety valve when required. Preferably, the yoke 31 applies pressure at which the safety valve opens directly to the valve head 22 in response to abnormal movement of its diaphragm. It will be noted that the operation of the yoke 31 is entirely independent of the cap 20 for the regulator spring housing.

As shown in the accompanying drawings, each regulator has a venting valve housing 33 shown as integral with the cover 12 and has an opening 34 leading to the atmosphere through a vent screen 35. A vent valve seat 36 having a vent valve 37 is urged against the seat 36 by a spring 38. When excessive gas pressure is applied to the underside of the diaphragm 11, the safety valve head 22 permits gas to escape to the chamber 14 through the vent valve 37, and to the vent housing 33, and out to the atmosphere.

According to the present invention, the service regulators A and B are joined together by a unitary valve body 39 having a socket portion 40A to receive a neck portion 41A on the housing 10 of the regulator A, and a socket portion 40B to receive a neck portion 41B on the housing 10 of the regulator B.

The passage 42 of each housing 10 communicates with an outlet chamber 43 of the valve body 39 which has a single outlet port 44 adapted to be connected to the pipe 45 of the downstream service system. Opposite the outlet port 44, the valve body 39 has an inlet port 46 leading to an inlet chamber 47. An internal dividing wall 48 separates the outlet chamber 43 from the inlet chamber 47. However, communication between the chambers 47 and 43 may only be had through orifice tubes 49A and 49B which cooperate with and are under the control of the valve seats 29A and 29B respectively.

Heretofore it has been quite common for two service regulators, such as the regulators A and B, to be installed in parallel with common outlet and inlet piping arrangements. In this way, two regulators, each having smaller orifices, could be used to meet the maximum volume required at the lowest inlet pressure instead of one regulator with a large orifice.

Since it was the practice to adjust such regulators to maintain the same outlet pressure and to pass one-half the volume of gas, if one of such regulators malfunctioned for any reason, the outlet pressure could exceed the predetermined overlimit and the functioning regulator would shut off its orifice. However, the nonfunctioning regulator would not shut off its orifice, but would continue to allow gas at full inlet pressure to flow to the outlet chamber 43 and escape past the safety valve heads 22 into the diaphragm chambers 14 causing the vent valves 37 to open and permit an excessive (and possibly dangerous) amount of gas to escape to the atmosphere.

The present invention retains the economical advantages of the parallel arrangement of the two service regulators as above referred to, and provides monitoring means for limiting or, if necessary, preventing the flow of gas at high pressure from the inlet chamber 47 to the outlet chamber 43 through the diaphragms 11 to the vent valves 37 and to the atmosphere.

For instance, if, as illustrated in FIGS. 2 and 3, an obstacle 50 becomes lodged between the orifice tube 49B and the valve seat 29B, the latter cannot function to restrict the orifice tube 49B, and therefore the under-the-diaphragm pressure will cause the diaphragm 11 in the functioning regulator A to move its valve seat 29A against its orifice tube 49A and stop the flow of gas thereto, but the gas would continue to flow through the orifice tube 49B with the result that a dangerous amount of gas may be forced into the atmosphere through the vent valves 37.

According to the present invention, this dangerous result of a malfunctioning regulator is prevented by providing a safety or monitoring valve to reduce or prevent the flow of gas from the inlet chamber 47 to or through the orifice tubes 49A and 49B.

This is accomplished, in the form of this invention illustrated in FIGS. 1 to 4, by having the orifice tubes 49A and 49B mounted coaxially in bushings 51 in opposite wall portions 48A and 48B of the dividing wall 48 for axial sliding movement toward and from each other, and providing a coil spring 52 interposed between flanges 53 of the tubes and normally holding the tubes in their outermost positions with the flanges 53 engaging the bushing 51. The spring 52 is so designed that in the extended position shown in FIG. 2 there is sufficient space between the coils to allow the free flow of gas under permissible overpressure. The ends of the bushings 51 have seals 51a.

In the normal functioning of the regulators, their diaphragms 11 move the valve seats 29A amd 29B toward and from the orifice tubes 49A and 49B respectively in maintaining the desired pressure of the gas at the outlet port 44 without disturbing the positions of the orifice tubes 49A and 49B.

Should either regulator for any reason fail to function as intended, the gas pressure in the outlet chamber 43 will momentarily rise or drop and the other regulator would respond maintaining the pressure within limits.

Thus, each regulator in effect acts as a monitor for the other. However, if the failure results in the normal overpressure being exceeded, which would occur if a piece of foreign matter 50 should be lodged between the orifice tube 49A and the valve seat 29B, for instance, as shown in FIG. 3, in being moved to closed position the valve seat 29A will engage the orifice tube 49A, close it and move it inwardly. At the same time the valve seat 29B cannot engage the orifice tube 49B because of the foreign matter 50, and therefore it would force the orifice tube 49B inwardly causing the coils of the spring 52 to be brought closer together more or less depending on the pressure of the gas under the diaphragms to restrict the flow of gas to the outlet chamber 43.

The proportions of the parts and their adjustments are such that when a determinate excessive overpressure is reached in the outlet chamber 43, the diaphragms 11 of both regulators will cause the valve seats 29A and 29B to apply sufficient force to the orifice tubes 49A and 49B to cause the coils of the spring 52 to come tightly together and close the space between the coils, thereby practically stopping the flow of gas to the outlet chamber 43, except for a slight amount that may seep through the metal-to-metal surfaces of the coils of the spring 52 and which may safely escape to the atmosphere through the vent valve 37.

In FIG. 5 there is shown a modification of the safety device shown in FIGS. 2 and 3. As shown in FIG. 5, the orifice tubes 49A and 49B, which are slidably mounted in bushings 51 in the portions 48A and 48B of the dividing wall 48, are held in their normal positions with flanges 53 thereon engaging said side wall by the spring 52. In this position, the inner ends 58 of the tubes 49A and 49B are far enough apart to allow gas to freely flow through the space 59 from the inlet chamber 47 through the spring 52 and orifice tubes to the outlet chamber 43.

If either of the valve seats 29A or 29B is prevented from engaging their respective orifice tubes 49A and 49B by foreign matter being lodged between the valve seat and the orifice tube, the latter will be moved inwardly causing the space 59 to be reduced and thus restrict the flow of gas to the orifice tubes. If the pressure of the gas is sufficiently excessive, the ends 58 of the orifice tubes, one or both of which may have a rubber tip 60, will be brought together to stop the flow of gas to the outlet chamber.

The provision of a coil spring functioning as a safety control for a service regulator is described and claimed in my U.S. Pat. No. 3,613,725 grated Oct. 19, 1971.

Variations and modifications may be made within the scope of the claims and portions of the improvements may be used without others.

I claim:

1. Gas pressure regulating means comprising two service regulators each having a housing, a cover therefor and diaphragm means secured therebetween and forming a service pressure chamber and an atmospheric pressure chamber; a unitary valve body forming a union between said regulators, said valve body having a dividing wall forming an inlet chamber adapted to be connected to an inlet line and an outlet chamber adapted to be connected to a service line, said outlet chamber being in direct communication with said pressure chambers of both said regulators, said valve body having two orifice means communicating with said inlet chamber and said outlet chamber, one of said orifice means being provided for each regulator; each said regulator having valve seat means and means connecting its diaphragm means to its valve seat means for operation thereof, said valve seat means cooperating with said orifice means to control the flow of gas therethrough to said outlet chamber, said orifice means collectively having such gas flow capacity as to supply the maximum volume required at the lowest inlet pressure, and said respective diaphragm means and valve seat means being adapted normally to function simultaneously and continuously to control the downstream pressure of said pressure regulating means, and auxiliary valve means in said valve body responsive to the outlet pressure of the gas adapted to regulate the flow of gas from said inlet chamber to said orifice means in the event either of said valve seat means or said orifice means fails to function as intended.

2. Gas pressure regulating means according to claim 1 in which said orifice means comprises two axially aligned orifice tubes mounted in said dividing wall in said valve body and axially slidable thereon; means for limiting the outward movement of said orifice tubes with the inner portions thereof axially spaced apart a determinate distance; said auxiliary valve means comprising a coil spring coaxial with said orifice tubes and engaging the inner ends of said tubes to normally hold the latter at the outer limits of their movements, said coil spring in expanded condition normally allowing gas to flow at a determinate rate from said inlet chamber through the spaces between its coils into said orifice tubes to said pressure chambers of the regulators, said coil spring being compressed to more or less close the spaces between its coils to reduce the flow of gas to said orifice tubes and to said pressure chambers when the inner ends of said orifice tubes are brought more or less together and to stop such flow of gas when said spaces between said coils are closed by force applied to one or both of said orifice tubes by said valve seat means due to malfunctioning of either or both regulators.

3. Gas pressure regulating means according to claim 2 in which there are cooperating stop means on said orifice tubes and said dividing wall limiting the outward movement of said orifice tubes under the influence of said coil spring.

4. Gas pressure regulating means according to claim 1 in which said orifice means comprises two spaced axially aligned orifice tubes axially slidably mounted in said dividing wall, cooperating stop means on said orifice tubes and said dividing wall to limit the outward movement of said orifice tubes with their inner ends of said tubes normally spaced from each other sufficiently to permit the flow of gas from the inlet chamber to the outlet chamber of said housing to the maximum rate of flow desired, and said auxiliary valve means comprises spring means holding said orifice tubes at the limits of their outward movements and adapted to yield to permit the relative movement between the inner ends of the orifice tubes to more or less close and open the space between said inner ends to regulate the flow of gas from the inlet chamber to the outlet chamber if foreign matter interposed between the outer ends of either tube and the valve seat means prevents the latter from closing the orifice and causes the orifice tube to move inwardly of the dividing wall.

* * * * *